US006756155B1

(12) United States Patent
Kweon et al.

(10) Patent No.: US 6,756,155 B1
(45) Date of Patent: Jun. 29, 2004

(54) POSITIVE ACTIVE MATERIAL FOR RECHARGEABLE LITHIUM BATTERIES AND METHOD OF PREPARING SAME

(75) Inventors: Ho-Jin Kweon, Cheonan-si (KR); Seung-Kee Kim, Cheonan-si (KR); Sang-Moon Hwang, Cheonan-si (KR); Young-Bae Roh, Cheonan-si (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/505,389

(22) Filed: Feb. 16, 2000

(30) Foreign Application Priority Data

Mar. 30, 1999 (KR) ........................................ 1999-11043

(51) Int. Cl.$^7$ .......................... H01M 4/52; H01M 4/40; H01M 4/88; C01D 15/02; B05D 5/12
(52) U.S. Cl. .............................. 429/231.95; 429/218.1; 429/224; 429/231.6; 429/232; 252/182.1; 423/179.5; 423/594.6; 427/126.3; 427/126.6; 427/126.1
(58) Field of Search .............................. 429/218.1, 224, 429/231.6, 231.95, 232; 423/179.5, 594.6; 252/182.1; 427/126.1, 126.3, 126.6

(56) References Cited

U.S. PATENT DOCUMENTS

| | | | | | |
|---|---|---|---|---|---|
| 6,071,649 | A | * | 6/2000 | Mao et al. ................ | 429/231.3 |
| 6,372,385 | B1 | * | 4/2002 | Kweon et al. ......... | 429/231.95 |
| 6,531,220 | B1 | * | 3/2003 | Kweon et al. .............. | 428/402 |
| 6,653,021 | B2 | * | 11/2003 | Kweon et al. ............ | 429/231.1 |
| 2001/0031397 | A1 | * | 10/2001 | Kweon et al. ............ | 429/218.1 |
| 2002/0031706 | A1 | * | 3/2002 | Dasgupta et al. ........... | 429/212 |
| 2002/0055042 | A1 | * | 5/2002 | Kweon et al. .............. | 429/223 |
| 2002/0061444 | A1 | * | 5/2002 | Kweon et al. ........... | 429/231.1 |
| 2002/0071991 | A1 | * | 6/2002 | Kweon et al. ........... | 429/231.1 |
| 2002/0076486 | A1 | * | 6/2002 | Kweon et al. ........... | 427/126.1 |
| 2002/0110736 | A1 | * | 8/2002 | Kweon et al. ........... | 429/231.1 |
| 2003/0003352 | A1 | * | 1/2003 | Kweon et al. .............. | 429/137 |
| 2003/0073004 | A1 | * | 4/2003 | Kweon et al. ......... | 429/231.95 |

FOREIGN PATENT DOCUMENTS

JP            8-153513            6/1996

\* cited by examiner

Primary Examiner—Joseph D. Anthony
(74) Attorney, Agent, or Firm—Blakely, Sokoloff, Taylor & Zafman

(57) ABSTRACT

Disclosed is a positive active material for a rechargeable lithium battery. The active material includes a cobalt-based compound selected from the group consisting of the compounds represented by the formulas 1 to 4. The active material has a structure of secondary particles with a size of 10 to 30 $\mu$m and the secondary particle is gathered with primary particles with a size of 1 to 5 $\mu$m. The active material includes a metallic oxide coated on the cobalt-based compound.

$$LiCoA_2 \quad (1)$$

$$LiCoO_{2-x}B_x \quad (2)$$

$$LiCo_{1-x}M_xA_2 \quad (3)$$

$$LiCo_{1-x}M_xO_{2-y}B_y \quad (4)$$

where A is selected from the group consisting of O, S, F and P,
B is selected from the group consisting of S, F and P,
M is a transition metal selected from Al, Mg, Cr or Mn; Sr; or lanthanide metal selected from La or Ce;
$0<x<1$ and $0<y<1$.

4 Claims, 3 Drawing Sheets

POSITIVE ACTIVE MATERIAL FOR RECHARGEABLE LITHIUM BATTERIES AND METHOD OF PREPARING SAME

CROSS REFERENCE TO RELATED APPLICATION

This application is based on application No. 99-11043 filed in the Korean Industrial Property Office on Mar. 30, 1999, the content of which is incorporated hereinto by reference.

BACKGROUND OF THE INVENTION (a) Field of the Invention

The present invention relates to a positive active material for a rechargeable lithium battery and a method of preparing and, more particularly, to a positive active material for a rechargeable lithium battery, having good structural and thermal safety properties and a method of preparing the same.

(b) Description of the Related Art

In recent years, the development of miniaturized portable electronics provoded needs for a rechargeable battery having a high capacity as well as a light weight. From the viewpoint of the capacity improvement per unit weight, the rechargeable lithium battery is preferred because lithium has a high standard potential as well as a low electrochemical equivalent weight.

Rechargeable lithium batteries employ materials into or from which lithium can be intercalated or deintercalated as positive and negative active materials.

Metallic lithium has been used for the negative active material in rechargeable lithium batteries. However, lithium metal has good reactivity toward electrolyte and deposits to form a dendric layer which increases the reactivity of lithium. The problem of lithium reactivity toward the electrolyte has been addressed by replacing the lithium metal with carbon-based materials. Owing to the use of the carbon-based active materials, the potential safety problem present in metallic lithium-based batteries can be prevented while achieving a relatively higher energy density as well as the reasonable shelf life.

A chalcogenide metal compound from or into which a lithium ion can be extracted or inserted, during a charge or discharge, is generally used for the positive active material. Alternatively, transition metal oxide-based compounds such as $LiCoO_2$, $LiMn_2O_4$, $LiNiO_2$, $LiNi_{1-x}Co_xO_2$ (0<x<1) or $LiMnO_2$ are generally used for positive active material. $LiNiO_2$ has a high charge capacity, but is difficulty produced. Manganese-based material such as $LiMn_2O_4$ or $LiMnO_2$, etc. is easiest to prepare, is less expensive than the other materials and has environmentally friendly characteristics, but has low capacities. $LiCoO_2$ is widely used as it has an electrical conductivity of about $10^{-2}$ to 1 S/cm at room temperature and high battery voltage, but has poor safety characteristics during high rate charges and discharges.

Generally, such composite metallic oxides are manufactured by the solid phase method. The solid phase method includes the steps of mixing with a solid raw material powder and sintering this mixture. For example, Japanese Patent publication No. Hei 8-153513 discloses a method in that $Ni(OH)_2$ is mixed with $Co(OH)_2$, or hydroxides including Ni or Co are mixed and the mixture is heat-treated, followed by the heat-treated mixture being ground and then the ground mixture sieved to produce $LiNi_{1-x}Co_xO_2$ (0<x<1). In another method, LiOH, Ni oxide and Co oxide react and the reactant is initially sintered at 400 to 580° C. and the sintered reactant is sintered a second time at 600 to 780° C. to produce a crystalline active material.

However, in such conventional methods, the resulting active material has both low structural and thermal stability, reducing the safety of the battery.

SUMMARY OF THE INVENTION

It is an object of the present invention to provide a positive active material for a rechargeable lithium battery, having excellent structural and thermal safety properties.

It is another object to provide a method of preparing the positive active material.

These and other objects may be achieved by a positive active material for a rechargeable lithium battery including a cobalt-based compound selected from the group consisting of compounds represented by the formulas 1 to 4:

$LiCoA_2$ (1)

$LiCoO_{2-x}B_x$ (2)

$LiCo_{1-x}M_xA_2$ (3)

$LiCo_{1-x}M_xO_{2-y}B_y$ (4)

where A is selected from O, S, F or P

B is selected from S, F or P

M is a transition metal selected from Al, Mg, Cr or Mn; Sr; or lanthanide metal selected from La or Ce, 0<x<1 and 0<y<1.

The compound includes secondary particles of 10 to 30 μm in size gathered with primary particles with a size of 1 to 5 μm. A surface of the active material is coated with metal oxide.

The present invention further includes a method of preparing the positive active material. In this method, a cobalt-based compound powder selected from the group consisting of formulas 1 to 4 is obtained. The compound includes secondary particles of 10 to 30 μm in size and the secondary particle is gathered with primary particles with a size of 1 to 5 μm. The powder of the compound is coated with a metal alkoxide solution or a metal aqueous solution to make a metallic alkoxide or metal-coated powder. The coated powder then heat-treated such that the metallic alkoxide or metal-coated powder is converted into a metallic oxide-coated powder.

DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
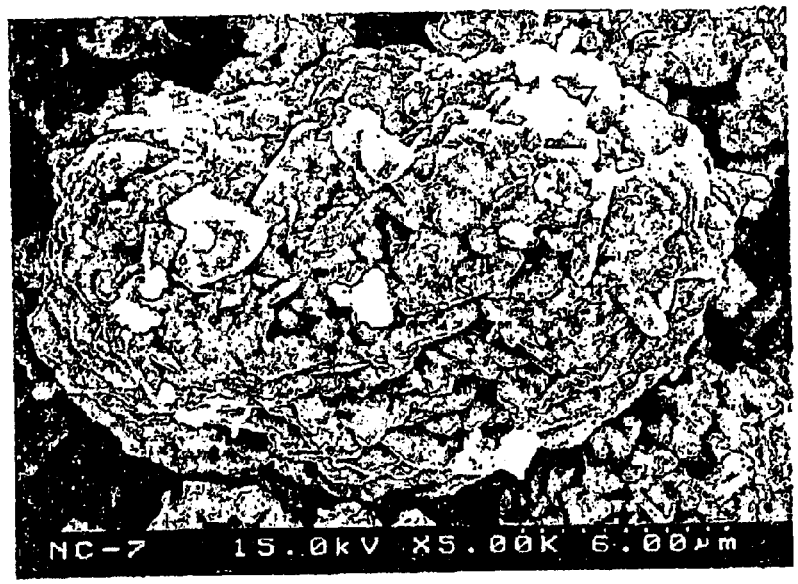
FIG. 1 is a scanning electron microscope (SEM) photograph of $LiCoO_2$ used in one embodiment of the present invention.

The present invention relates to a positive active material for a rechargeable lithium battery that includes a compound selected from the group consisting of compounds represented by the formulas 1 to 4:

$$LiCoA_2 \tag{1}$$

$$LiCoO_{2-x}B_x \tag{2}$$

$$LiCo_{1-x}M_xA_2 \tag{3}$$

$$LiCo_{1-x}M_xO_{2-y}B_y \tag{4}$$

where A is selected from O, S, F or P,

B is selected from S, F or P,

M is a transition metal selected from Al, Mg, Cr or Mn; Sr; or a lanthanide metal selected from La or Ce, $0<x<1$ and $0<y\ 1$.

A surface of the active material is coated with metallic oxide.

The cobalt-based compound expressed by the formulas 1, 2, 3, or 4 may be obtained by the following method, or are available by commercial purchased.

Cobalt salts are mixed with lithium salts in a desirable equivalent ratio. The cobalt salts may include cobalt hydroxide, cobalt nitrate or cobalt carbonate and the lithium salt may include lithium nitrate, lithium acetate or lithium hydroxide. LiF or NaS is additionally used in the mixing step.

The mixing step may be performed with a technique known in the related art, for example a mortar grinder mixing process. If the mixing step is performed with the mortar grinder mixing process, a suitable solvent is added to the mixture and the mortar grinder mixing process is performed until a solvent-free condition is reached.

The resulting mixture is heat-treated to about 400 to 600° C. to produce semi-crystalline cobalt-based compound powder selected from the group consisting of formulas 1 to 4. Alternatively, a first heat-treating step is performed at 400 to 550° C. for 1 to 5 hours and a second heat-treating is performed at 700 to 900° C. for 10 to 15 hours. If the first heat-treating step temperature is less than 400° C., cobalt salts do not completely react with lithium salts. Whereas, if the second heat-treating step temperature is less than 700° C., it is difficult to form a crystalline material. The heating step is performed by increasing temperature at a rate of 1 to 5° C./min under conditions of circulating dry air. The mixture is allowed to stand at the first or second heat-treating temperature for a predetermined time and cooled. As a result, a powder of a compound selected from the group consisting of the compounds represented by the formulas 1 to 4 is obtained.

The powder is re-mixed at room temperature to uniformly distribute lithium salt in the powder. The resulting compound powder includes secondary particles gathered with primary particles. The secondary particle has a size of 10 to 30 μm and the primary particle has a size of 1 to 5 μm.

The cobalt-based compound powder is coated with a metallic alkoxide solution or a metallic aqueous solution. The metallic alkoxide solution is formed by the reaction of an alcohol with an alkali metal of 1 to 30 wt % of the alcohol. The alkali metal may be preferably selected from Mg, Al, Co, K, Na, Ca, Si, Ti or V. More preferably, the alkali metal is selected from Mg. The alcohol is preferably selected from methanol or ethanol. When the alkali metal is less than 1 wt % of the alcohol, the coating effect of the metallic alkoxide solution onto the powder in not induced. In contrast, when the alkali metal is, more than 30 wt % of the alcohol, the coatings layer of the metallic alkoxide solution becomes undesirably thick. The metallic aqueous solution is prepared by mixing metallic oxide with water. The metallic oxide may include vanadium oxides. The coating method may include a sputtering technique, a chemical vapor deposition (CVD), a dip coating and other general-purpose coating techniques. Among the techniques, the dip coating may be preferably used for coating the metallic alkoxide solution onto the powder.

The coated powder is dried at 120° C. for about 5 hours in an oven. The drying step is performed to uniformly distribute lithium salt in the powder. Thereafter, the dried powder is heat-treated at 300 to 800° C. The heating step is performed under an atmosphere where dry air or oxygen is circulating. When the heat-treating temperature is lower than 300° C., the metallic alkoxide solution or the metallic aqueous solution coated on the powder is not crystallized so as to prohibit the free movement of lithium ions in the active material.

According to the heat-treating step, the metallic alkoxide solution or metal aqueous solution is converted into a metallic oxide. In this way, a metallic oxide-coated active material is prepared. The active material is selected from the group consisting of compound represented by the formulas 1 to 4. The active material includes secondary particles of 10 to 30 μm in size. The secondary particle is prepared by gathering primary particles with a size of 1 to 5 μm.

The metallic oxide formed on the surface of the powder may be derived from a single metallic alkoxide of metal hydrate source, or from composite sources of cobalt and metallic alkoxide. For example, $LiCoO_2$ can be coated with an aluminum alkoxide sol and then this alkoxide-coated $LiCoO_2$ is heat-treated to produce a positive active material coated with composite metallic oxide of cobalt and aluminum and/or aluminum oxide.

The following examples further illustrate the present invention.

EXAMPLE 1

1 M LiOH and 1 M $Co(OH)_2$ were dissolved in distilled water. Ethanol of sufficient amount to completely react the mixture was added to the mixture and a mortar grinder-mixing step was performed till the ethanol-free condition.

The resulting mixture was initially heat-treated at 400° C. for 5 hours under an atmosphere where dry air was circulating. The first heat-treated mixture was re-mixed to uniformly distribute lithium salts in the mixture. The re-mixed mixture was again heat-treated at 750° C. for 12 hours by increasing temperature at a rate of 3° C./min. At this time, the first and the second heat-treating temperatures were maintained for a predetermined time and then the mixture was cooled. As a result, crystalline $LiCoO_2$ powder was obtained. This $LiCoO_2$ powder had secondary particles with a size of about 10 μm. The secondary particle was prepared by gathering primary particles with a size of 1 μm.

The $LiCoO_2$ powder was dipped into a Mg-methoxide solution for about 10 minutes and the dipped $LiCoO_2$ powder was separated from the solution. The dipped $LiCoO_2$ powder was then dried at 120° C. for about 5 hours in an oven to thereby prepare a Mg-methoxide coated $LiCoO_2$ powder. Then, the Mg-methoxide coated $LiCoO_2$ powder was heat-treated at 600° C. for about 10 hours under an atmosphere where dry air was circulating to thereby prepare a Mg oxide-coated active material.

Then, the active material was mixed with Super P carbon as a conductive agent, KF-1300 polyvinylidenefluoride as a binder and N-methylpyrrolidone as a solvent to prepare an active material slurry. The slurry was cast into a tape shape to act as a positive electrode. The positive electrode was then assembled with a lithium metal foil for a counter electrode by using a lithium salt solution for an electrolyte to thereby fabricate a coin cell-type half-cell. The lithium salt solution included a 1:1 volume ratio of ethylene carbonate and dimethyl carbonate as a solvent and 1M $LiPF_6$ as a solute.

EXAMPLE 2

A positive electrode was prepared in the same way as in Example 1 with the exception that the Mg-methoxide coated $LiCoO_2$ powder was heat-treated at 700° C. A coin-type half-cell was fabricated with the resulting positive electrode in combination with the other components as described in Example 1.

COMPARATIVE EXAMPLE 1

A positive electrode was prepared in the same way as in Example 1 its with the exception that $LiCoO_2$ powder (commercially available from Nippon Chemical under the trade name NC-10) was dipped into a Mg-methoxide solution. The $LiCoO_2$ powder included smooth surfaced mono particles of a 10 $\mu$m size. A coin-type half-cell was fabricated with the resulting positive electrode in combination with the other components as described in Example 1.

COMPARATIVE EXAMPLE 2

A positive electrode was prepared in the same way as in Comparative Example 1 with the exception that the Mg-methoxide coated $LiCoO_2$ powder was heat-treated at 700° C. A coin-type half-cell was fabricated with the resulting positive electrode in combination with other components as described in Example 1.

Figure 2:
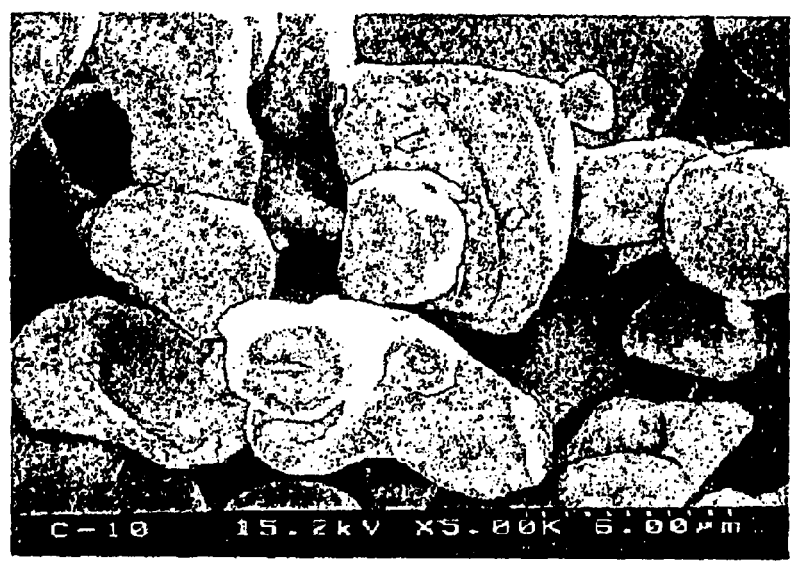
FIG. 2 is a SEM photograph of $LiCoO_2$ used in Comparative Example of the present invention.

FIG. 1 is a SEM photograph of the $LiCoO_2$ powder used in Examples 1 or 2, and FIG. 2 is a SEM photograph of the $LiCoO_2$ powder used in Comparative Examples 1 or 2. As shown in FIG. 1, the $LiCoO_2$ powder used in Examples 1 or 2 included secondary particles with a size of about 10 $\mu$m. The secondary particle was gathered with primary particles with a size of 1 $\mu$m. As shown in FIG. 2, the $LiCoO_2$ powder used in Comparative Examples 1 or 2 had smooth surfaced mono particles with a size of 10 $\mu$m.

In order to assess the stability of the cells of Example 1 and Comparative Example 1, a DSC analysis performed. The DSC analysis result illustrates the thermal stability properties of the sample. After charging a lithium cell, a structure of a positive active material is converted from $LiCoO_2$ to by $Li_{1-x}Co_xO_2$. Because the $Li_{1-x}Co_xO_2$ active material is unstable, oxygen boned with metal (Co—O) decomposes according to increases in temperatures. The decomposed oxygen may react with an electrolyte in a cell and causes the cell to explode. Accordingly, the temperature and the quantity of heat evolved when oxygen decomposed significantly effect the stability of the cell.

Figure 3:
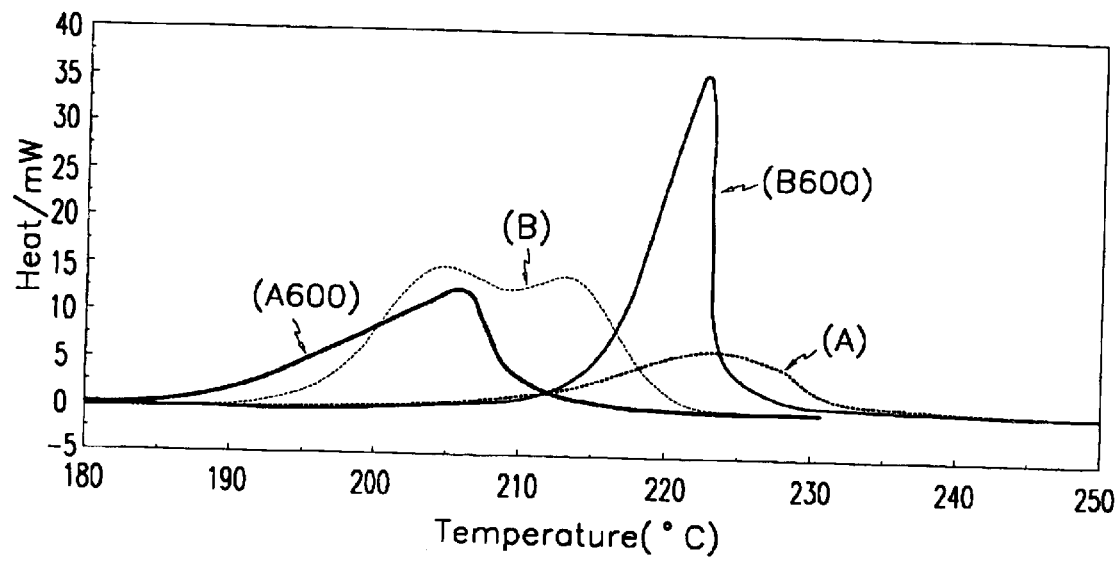
FIG. 3 is a graph illustrating differential scanning calorimetry (DSC) analysis results with respect to positive electrodes of one embodiment and Comparative Example of the present invention after the electrodes are charged by 4.3V.

The cells of Example 1 and Comparative Example 1 were charged by 4.3V and the positive electrode was removed from the cells. In the positive electrodes, $LiCoO_2$ was converted into $Li_{1-x}CoO_2$. The DSC on the electrodes was performed and the results are shown in FIG. 3. In FIG. 3, the DSC analysis result of $LiCoO_2$ used in Comparative Example 1 is indicated by a parenthesized symbol A, and that of $LiCoO_2$ coated with Mg-oxide used in Comparative Example 1 is indicated by another symbol A600. The DSC analysis result of $LiCoO_2$ used in Example 1 is indicated by a parenthesized symbol B, and that of $LiCoO_2$ coated with Mg-oxide used in Example 1 is indicated by another symbol B600. The oxygen decomposition temperature of A600 is lower than A. The result shows that the metallic oxide-coating layer decreases the thermal stability of the $LiCoO_2$ powder having smooth surfaced mono particles. Whereas, the metallic oxide coating layer increases the thermal stability of the $LiCoO_2$ powder having secondary particles with a size of about 10 $\mu$m gathered with primary particles with a size of 1 $\mu$m. It is also seen that the oxygen decomposition temperature in B600 is higher than B and the quantity of heat evolved is lower than B. These results consider the fact that the structure of the $LiCoO_2$ powder used in Example 1 is different from, Comparative Example 1. Namely, the $LiCoO_2$ used in Example 1 has larger specific surface area than the $LiCoO_2$ used in Comparative Example 1 such that the metallic-oxide,coating effect in Example 1 is different from that in Comparative Example 1.

Figure 4:
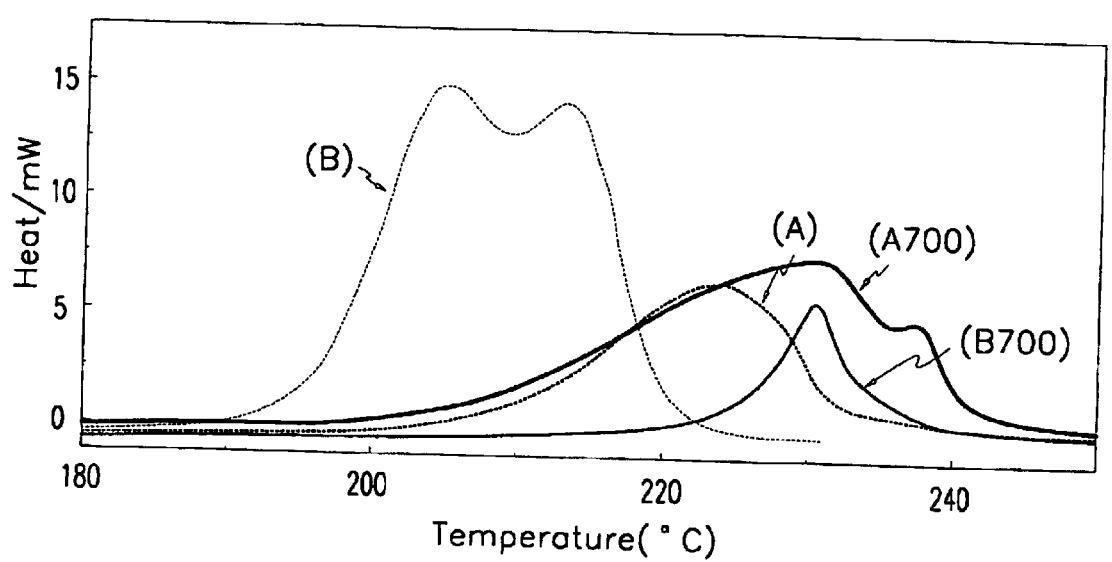
FIG. 4 is a graph illustrating DSC analysis results with respect to positive electrodes of another embodiment and Comparative Example of the present invention after rechargeable cells are charged by 4.3V.

The DSC analysis also was performed with respect to the position electrode prepared according to Example 2 and Comparative Example 2 and the results are shown in FIG. 4. In FIG. 4, the DSC analysis result of $LiCoO_2$ used in Comparative Example 2 is indicated by a parenthesized symbol A, and that of $LiCoO_2$ coated with Mg-oxide used in Comparative Example 1 is indicated by another symbol A700. The DSC analysis result of $LiCoO_2$ used in Example 2 is indicated by a parenthesized symbol B and that of $LiCoO_2$ coated with Mg-oxide used in Example 2 is indicated by another symbol B700. The result also indicates that the metallic-oxide coating beneficially effects the $LiCoO_2$ in Example 2, as opposed to its effects on the $LiCoO_2$ in Comparative Example 2.

Figure 5:
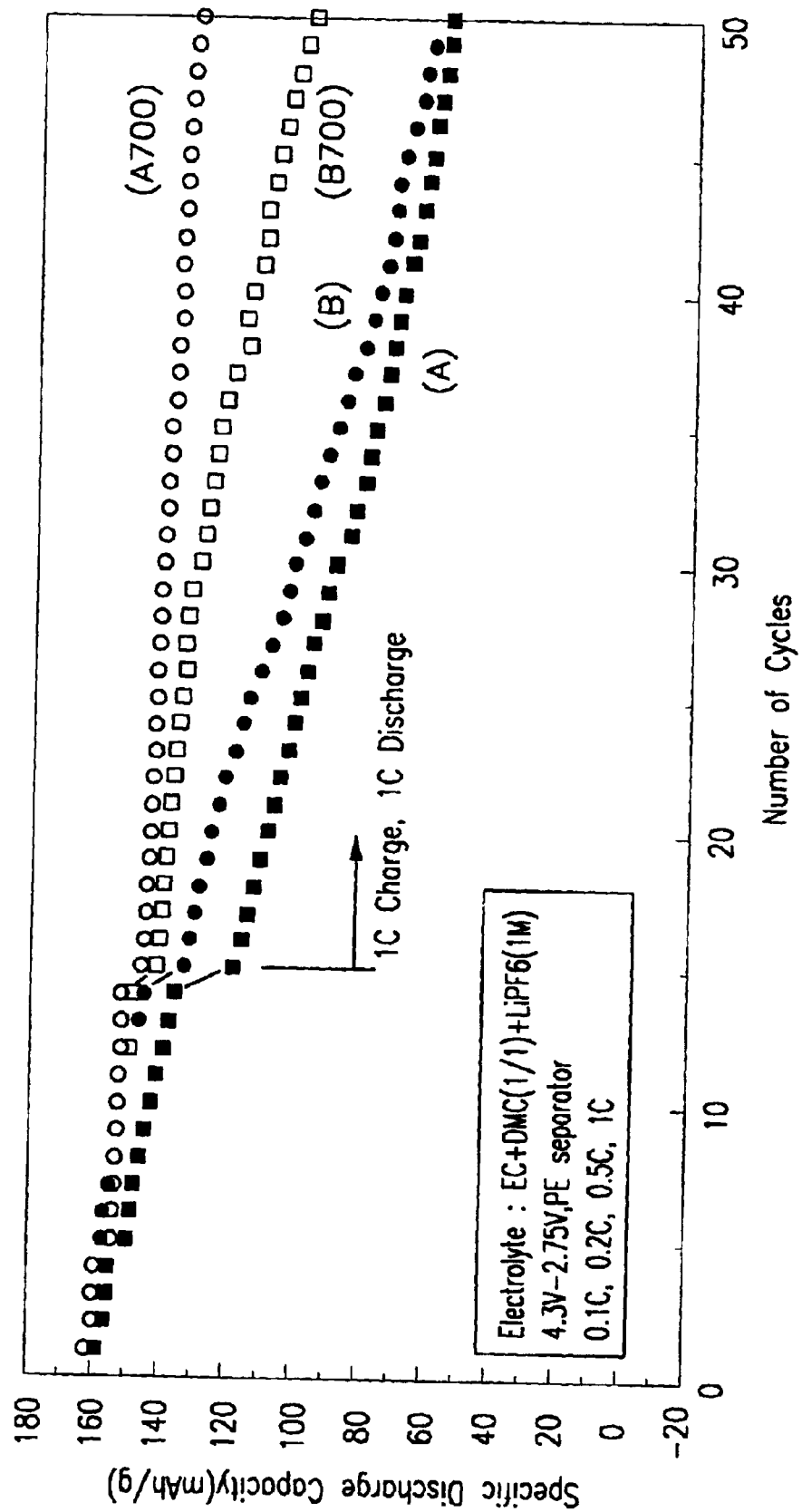
FIG. 5 is a graph illustrating cycle life characteristics of the rechargeable lithium cells of the another embodiment and Comparative Example of the present invention.

FIG. 5 shows cycle life characteristics of the cells according to Example 2 and Comparative Example 2. The cycle life characteristic of the cell according to Example 2 is indicated by a parenthesized symbol A700 and that of the cell according to Comparative Example 2 is indicated by a parenthesized symbol B700. Further, the cycle life characteristic of the cell which is prepared by the same method in Example 2 (except for using $LiCoO_2$ without the metallic-alkoxide coating operation) is indicated by a parenthesized symbol A. The cycle life characteristic of the cell which is prepared by the same method Comparative example 2 (except for using $LiCoO_2$ without the metallic-alkoxide coating operation) is indicated by a parenthesized symbol B. As shown in FIG. 5, (A700) and (B700) have better cycle life characteristics than (A) and (B). In addition, (A700) has the best cycle life characteristics.

EXAMPLE 3

A positive electrode was prepared in the same way as in Example 1 with the exception that crystalline $LiCoF_2$ powder was prepared by mixing LiOH, $Co(OH)_2$ and LiF. A coin-type half-cell was fabricated with the resulting positive electrode in combination with the other components as described, in Example 1.

EXAMPLE 4

A positive electrode was prepared in the same way as in Example 1 with the exception that crystalline $LiCoS_2$ powder was prepared by mixing LiOH, Co(OH)$_2$ and NaS. A coin-type half-cell was fabricated with the resulting positive electrode in combination with the other components as described in Example 1.

The SEM result of LiCoF$_2$ and LiCoS$_2$ used in Examples 3 and 4 respectively was similar to Example 1. Accordingly, it is presumed that the LiCoF$_2$ and LiCoS$_2$ powder have secondary particles gathered With primary particles. In addition, the DSC results of LiCoF$_2$ and LiCoS$_2$ with and without a metallic-alkoxide coating operation were similar to Example 1, thus indicating that the thermal stability is improved by the metallic-oxide coating.

As described above, the positive active material of the present invention has been shown to have good thermal and structural safety properties.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery, the positive active material comprising:
   a cobalt-based compound selected from the group consisting of compounds represented by formulas 1 to 4; and
   a metallic oxide coated on the cobalt-based compound;
   the positive active material including secondary particles with a size of 10 to 30 μm, the secondary particle being prepared by gathering primary particle with a size of 1 to 5 μm;

$$LiCoA_2 \quad (1)$$

$$LiCoO_{2-x}B_x \quad (2)$$

$$LiCo_{1-x}M_xA_2 \quad (3)$$

$$LiCo_{1-x}M_xO_{2-y}B_y \quad (4)$$

where A is selected the group consisting of O, S, F and P,
   B is selected the group consisting of S, F and P,
   M is a transition metal selected from the group consisting of Al, Mg, Cr and Mn; Sr; or lanthanide metal selected from La or Ce;
   0<x<1 and 0<y<1.

2. The positive active material of claim 1, wherein the metallic oxide is selected from the group consisting of Mg, Al, Co, K, Na, Ca, Si, Ti and V.

3. A method of preparing a positive active material for a rechargeable lithium battery, comprising the steps of:
   obtaining a powder from a source material, the source material being selected from the group consisting of compounds represented by the formulas 1 to 4 and including secondary particles with a size of 10 to 30 μm, the secondary particle being prepared by gathering primary particles with a size of 1 to 5 μm;
   coating the powder with a metallic alkoxide solution or a metal aqueous solution to make an metal alkoxide or metal hydrate-coated powder; and
   heat-treating the metal alkoxide or metal hydrate-coated powder such that the metallic alkoxide or metal hydrate-coated powder is converted into a metallic oxide-coated powder.

$$LiCoA_2 \quad (1)$$

$$LiCoO_{2-x}B_x \quad (2)$$

$$LiCo_{1-x}M_xA_2 \quad (3)$$

$$LiCo_{1-x}M_xO_{2-y}B_y \quad (4)$$

where A is selected from the group consisting of O, S, F and P,
   B is seeded from the group consisting of S, F and P,
   M is a transition metal selected from the group consisting of Al, Mg, Cr and Mn; a transition metal selected from the group consisting of Cr and Mn; Sr; or lanthanide metal selected from La or Ce;
   0<x<1 and 0<y<1.

4. The method of claim 3, wherein the heat-treating step is performed at 300 to 800° C. under an air or oxygen atmosphere.

* * * * *